US012632849B2

(12) United States Patent
Pethe

(10) Patent No.: US 12,632,849 B2
(45) Date of Patent: May 19, 2026

(54) SYSTEM FOR PROVIDING VIRTUAL CARD USING MOBILE COMMUNICATION DEVICE AND METHOD THEREOF

(71) Applicant: Suresh Pethe, Pune (IN)

(72) Inventor: Suresh Pethe, Pune (IN)

( * ) Notice: Subject to any disclaimer, the term of this patent is extended or adjusted under 35 U.S.C. 154(b) by 364 days.

(21) Appl. No.: 18/001,671

(22) PCT Filed: Jul. 12, 2021

(86) PCT No.: PCT/IN2021/050675
§ 371 (c)(1),
(2) Date: Dec. 13, 2022

(87) PCT Pub. No.: WO2022/013885
PCT Pub. Date: Jan. 20, 2022

(65) Prior Publication Data
US 2023/0334464 A1 Oct. 19, 2023

(30) Foreign Application Priority Data
Jul. 13, 2020 (IN) .............................. 202021029633

(51) Int. Cl.
*G06Q 20/32* (2012.01)
*G06Q 20/34* (2012.01)
*H04W 8/20* (2009.01)

(52) U.S. Cl.
CPC ....... *G06Q 20/3227* (2013.01); *G06Q 20/351* (2013.01); *H04W 8/205* (2013.01)

(58) Field of Classification Search
CPC ................................................ G06Q 20/3227
See application file for complete search history.

(56) References Cited

U.S. PATENT DOCUMENTS

2005/0131824 A1* 6/2005 Drummond ............. G06F 17/60
2017/0286954 A1* 10/2017 Mehta .................... G06Q 20/10

FOREIGN PATENT DOCUMENTS

IN 201621029502 A 9/2016
WO 2010125577 A1 4/2010
(Continued)

OTHER PUBLICATIONS

Swathi, et al., in "A Novel ATM Security System using a User Defined Personal Identification Number With the Aid of GSM Technology," from 2018 Second International Conference on Advances in Electronics, Computer and Communications (Year: 2018).*
(Continued)

*Primary Examiner* — Mike Anderson
*Assistant Examiner* — Brandon M Duck
(74) *Attorney, Agent, or Firm* — Renner, Otto, Boisselle & Sklar, LLP

(57) ABSTRACT

Disclosed is a system for providing a virtual card using a mobile communication device and payment methods using the same. The virtual card is issued to a user by any financial institute, being adapted to authorize the user to withdraw the cash and/or pay for any product or service. The system (100) includes a mobile communication device (101) and an ATM (102), each with a SIM card and a communication module. The method includes the activation of the virtual card and allowing the user to do any kind of transaction like withdrawal, credit and/or debit for any product or service in response to the authentication procedure involving a PIN with 4 digit random number combination. Thus, the invention reduces the possibility of the scamming. The invention also does not require any physical card to be issued, hence reducing the possibility of identity theft by using fraudulent information and applying for new cards on the user's behalf.

4 Claims, 7 Drawing Sheets

(56)  References Cited

FOREIGN PATENT DOCUMENTS

| WO | WO 2010125577 | * 11/2010 | |
| WO | WO 2013133881 | * 9/2013 | ............ G06Q 20/32 |

OTHER PUBLICATIONS

International Search Report and Written Opinion for related International Application No. PCT/IN2021/050675 mailed Oct. 22, 2021.

* cited by examiner

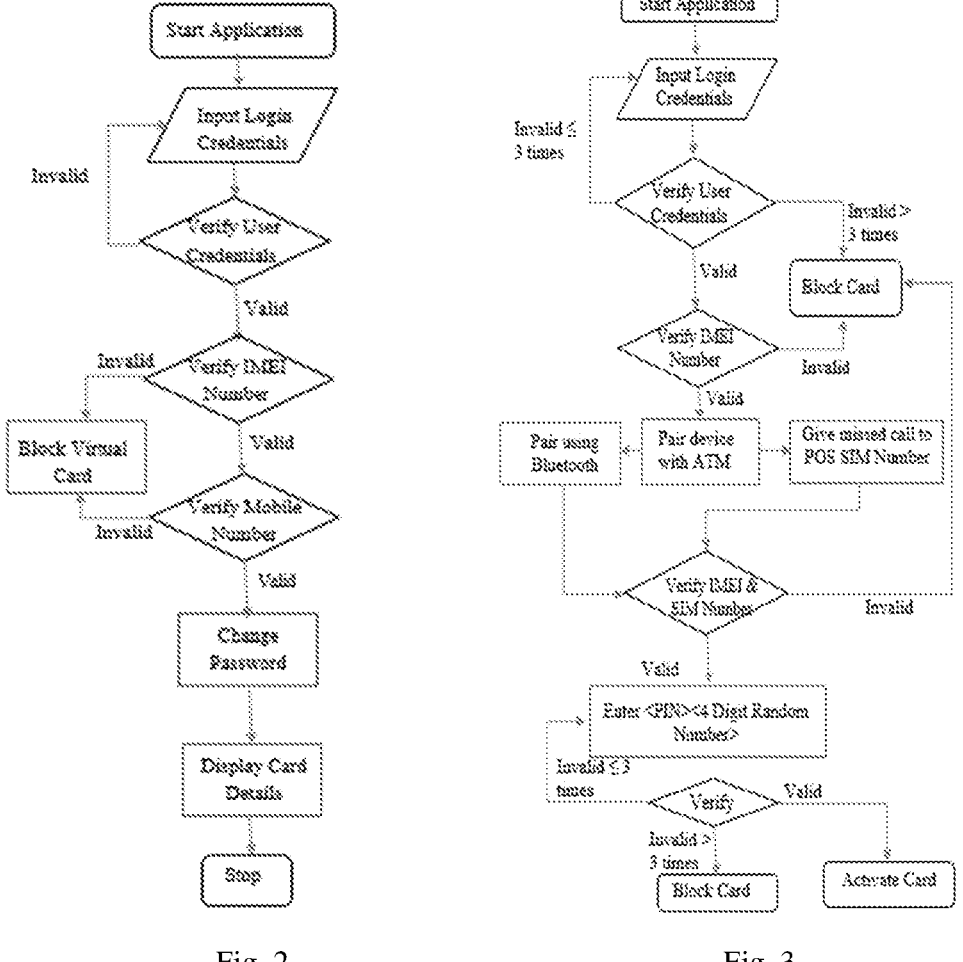
Fig. 2                    Fig. 3

SYSTEM FOR PROVIDING VIRTUAL CARD USING MOBILE COMMUNICATION DEVICE AND METHOD THEREOF

This application is a national phase of International Application No. PCT/IN2021/050675 filed Jul. 12, 2021, which claims priority to India application No. 202021029633 filed Jul. 13, 2020, the entire disclosures of which are hereby incorporated by reference.

FIELD OF THE INVENTION

The present invention relates to the field of virtual payment mechanism and more particularly, to a system for providing a virtual card using a mobile communication device and a method thereof.

BACKGROUND OF THE INVENTION

Several payment related scams have come to light in recent years. Scammer uses one's physical card to make an unauthorized purchase. Scammers steal card number, pin, and security code to make unauthorized transactions without a physical card. Scammers can use skimmers at the point of sale and use it to make a duplicate card.

The most common identity theft is credit card fraud as there is a possibility of data breach as scammers can do identity theft by using fraudulent information and applying for new cards on the user's behalf.

According to the Nilson Report, the leading global card and mobile payment's trade publication, fraud losses worldwide have been recorded as $30 billion in 2019 as against $27.85 billion in 2018, showing a continuous upward trend. These losses are projected to rise above $37 billion by 2024 and $40.63 billion by 2027. Also, as published by IDEX Biometric, 46% of the world's credit card fraud happens in the United States out of which 25.7% charges were made to an existing credit card, 21.4% were made using an existing checking or savings account, 15.9% of transactions were made using an existing debit account, 10.5% of transactions were made on an existing loan or line of credit, and 18.5% of transactions were made using financial accounts such as PayPal.

Also, in the current scenario of COVID-19, there is a need of a system for contactless cash withdrawal as the COVID-19 virus has very high infectivity.

Many prior arts describe about uploading details of any physical card on the user device as a virtual card which can be used as a transaction carrier for doing any kind of payments. This virtual card can be shared between friends and families to allow them to use it. The virtual card authentication can be done using any of the user credentials including user name, password, PIN, or OTP. This kind of authentication can be easily spoofed if the user device gets stolen.

AblePay Technologies has developed SIM/SAM card technology with built-in Bluetooth Low Energy (BLE) to enable mobile phone payment and related services. The user has to buy and fit the SAM card into their POS terminal or mobile phone for payment.

Accordingly, there exists a need to provide a system for providing virtual card using mobile communication device and a method thereof that overcomes the above mentioned drawbacks in the prior art.

OBJECTS OF THE INVENTION

An objective of the present invention is to provide a secure system for virtual card using mobile communication device and method thereof in the form of an application on android, iOS, and the like.

Another objective of the present invention is to provide a virtual card to use without the hassles of carrying it physically.

Another objective of the present invention is to provide contactless cash withdrawal without need to touch the ATM except for taking the cash.

Another object of the present invention is to provide a virtual debit/credit card to the user for a secure user experience while transacting online and cash withdrawals.

Another object of the present invention is to provide a secure virtual debit/credit card to use at POS terminals.

Still another object of the present invention is to ensure secure transactions through scanning of QR codes of merchants or any other beneficiaries.

Yet another object of the present invention is to address the frauds with a simple and secure mobile application.

SUMMARY OF THE INVENTION

Accordingly, the present invention provides a system for providing a virtual card using a mobile communication device and a method thereof. The system comprises a virtual card application configured on the mobile communication device and an automated teller machine (ATM). The mobile communication device includes a SIM card, a memory unit and a communication module. The ATM includes a SIM card, a communication module, a backend processor and a display unit. The virtual card is a credit/debit card issued by a bank to a user, which is displayed on the mobile communication device of the user after successfully entering the user credentials provided by the bank itself. The virtual card gives the user an opportunity to do safer, flexible and convenient transactions. The invention provides a platform to the user for any kind of financial transactions including cash withdrawal, online payment, transaction via POS terminals and QR codes. Regarding the authentication procedure, the user needs to enter a PIN with 4 digits random code, where this 4 digits random code should be different at each transaction. This authentication procedure adds more security to each transaction cycle.

BRIEF DESCRIPTION OF THE DRAWINGS

The objects and advantages of the present invention will become apparent when 25 the disclosure is read in conjunction with the following figures, wherein

FIG. 2 shows a flowchart of the method for providing the virtual card, in accordance with the present invention;

FIG. 3 shows a flowchart of the method for activating the virtual card, in accordance with the present invention;

DETAILED DESCRIPTION OF THE INVENTION

The foregoing objects of the present invention are accomplished and the problems and shortcomings associated with the prior art, techniques and approaches are overcome by the present invention as described below in the preferred embodiments.

Figure 1:
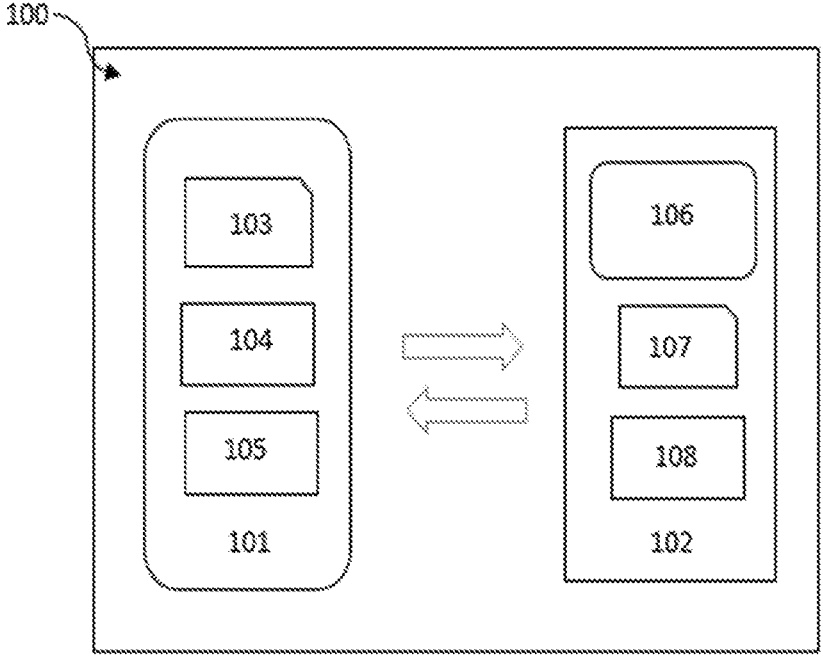
FIG. 1 shows a block diagram of the system for providing a virtual card, in accordance with the present invention.

Referring to FIG. 1, the present invention provides a system for providing a virtual card on a mobile communication device. The system (100) comprises a virtual card application configured on the mobile communication device (hereinafter "the mobile device (101)') and an automated teller machine (hereinafter "ATM (102)").

The virtual card works in every possible payment method like cash withdrawal, debit, credit, and QR (wallets, UPI etc.). The mobile device (101) includes, but are not limiting to, smart phones, handheld devices, tablet computers, cellular telephone, mobile phones, portable devices, computing devices and the like. The mobile device (101) includes a SIM card (103), a memory unit (104) and a communication module (105). Specifically, the communication module (105) is a wireless communication module such as Bluetooth. The memory unit (104) is configured with the virtual card application having a graphical user interface (GUI).

The ATM (102) includes a display unit/screen (106), a SIM card (107), a communication module (108), and a backend processor. Specifically, the communication module (108) is a wireless communication module such as Bluetooth. The ATM (102) is configured to display the phone number mapped with the SIM card thereon.

In the present invention, the virtual card is issued by a financial institute such as a bank to customers of the bank, also referred as an authorized user (hereinafter referred as "the user"). The system (100) requires information like mobile number, IMEI number of the mobile communication device, email address and other KYC documents as required by the bank. The issuer bank's customer/user gets the application installation guide, and login credentials including user id and temporary password to login to the virtual card application from respected bank sites. The user needs to install the virtual card application on their mobile communication devices (101).

In another aspect, the present invention provides a method for providing a virtual card on a mobile communication device. The method facilitates financial transaction using the virtual card. Specifically, the method is described in conjunction with the system.

Referring to FIGS. 2 & 3, in a first step, the method involves logging in the virtual card application by an authorized user with credentials. The credentials are user id and password provided by the issuer bank. In an embodiment, a background check is carried out to verify whether the entered user id and password combination is correct. Further, verification is carried out to check whether the IMEI number provided by the customer against the user id and password combination matches with the actual device IMEI number. The mobile user needs to grant permission to the virtual card application to validate the IMEI number. Also, if the mobile number entered by the user against the user id-password combination matches with the actual mobile number active in the mobile device (101) is verified.

In the next step, the method involves guiding the user to a screen which shows the message asking the user to change the temporary password to a login password. In this step, the user needs to submit 4 digit PIN of choice using the GUI. Next, the user is directed to a screen where the virtual card is displayed with 16 digits card number, type of card (credit/debit), respected bank logo and card service provider's details. The virtual card is not be active by default and to activate the virtual card, the user needs to visit the issuer bank's ATM as a one-time activity. Further, the user needs to login to the virtual card application and pair his/her device (101) through Bluetooth to the ATM (102). Once paired, the user is prompted to enter the 4 digit PIN chosen and append 4 digit random number of the user's choice to the PIN and click Submit.

The backend processor checks if the IMEI number of the device (101) and 'PIN appended 4-digit random number' are correct, then saves the random number entered and activates the card.

In an another embodiment, the user gives 2 rings missed call to the phone number displayed on the ATM display screen (106). The ATM requires an active SIM (107) association in this case. The ATM verifies the IMEI number of the device (101) of the user and gets the user information from the backend processor. If the caller device's IMEI number matches the backend entry, the user needs to enter the activation code as <4 digits PIN><Random OTP of user choice>. If the caller number does not match the backend entry, an error message is displayed on the ATM display screen (106) and the transaction is cancelled. If the combination passcode/activation code is correct, the user gets a message that the virtual card is activated and ready for use. If the combination passcode is incorrect, the customer gets 2 more chances to re-enter the correct PIN and random number of the user's choice. After the third wrong attempt, the virtual card is blocked, and the user has to visit the bank for re-activation.

In an exemplary embodiment, the user can withdraw cash from the ATM (102) via Bluetooth pairing.

Figure 4:
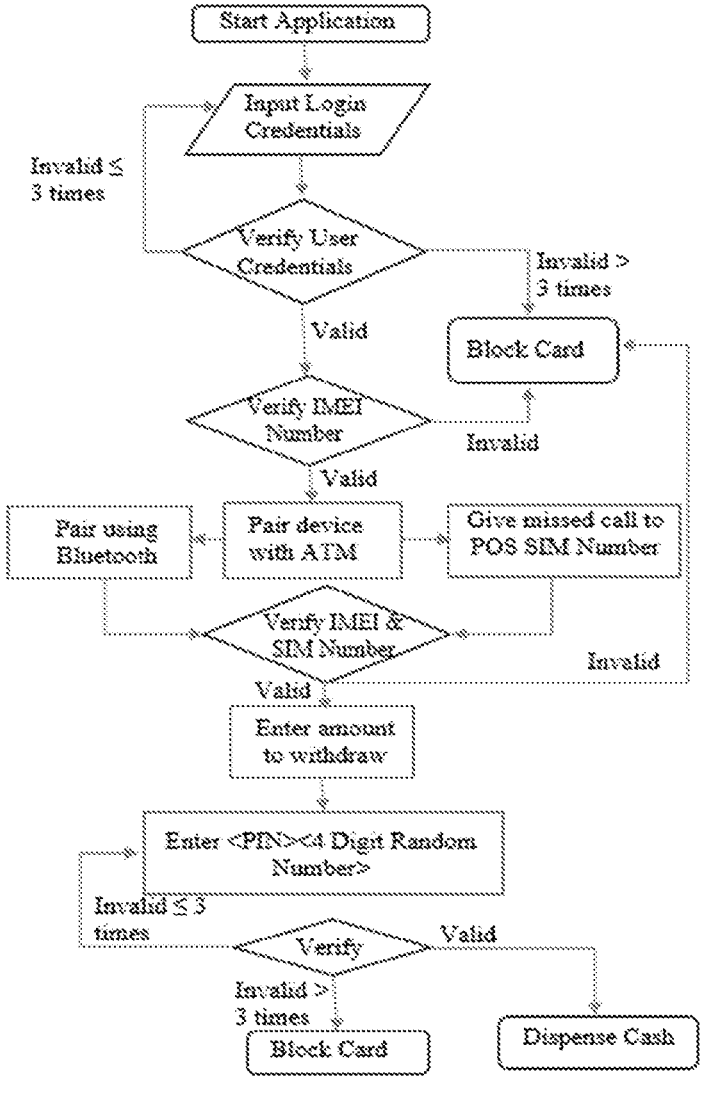
FIG. 4 shows a flowchart of the method for dispensing cash using the virtual card, in accordance with the present invention.

In this one embodiment, referring to FIG. 4, the user goes to the ATM (102) and logs in to the virtual card application on the mobile device (101). Next, the user is prompted to start Bluetooth and pair the mobile device (101) with the ATM (102). The backend processor of the ATM (102) confirms IMEI number of the mobile device (101), if it matches with backend information, the mobile device (101) get paired with the ATM (102), and if IMEI number does not matches, the transaction get cancelled and the user needs to visit the respected bank. Once the device is paired, the ATM (102) prompts the user to enter the amount to withdraw on the virtual card application.

Once the amount is entered, the user is prompted to enter the 4 digit PIN and 4 digit random number of choice to process the transaction in the virtual card application. The user has to take a note that the random number should not be used in consecution for example the random number used in the last previous transaction cannot be used in the immediately next transaction. The ATM dispenses the cash based on the account balance in case of the debit card and cash withdrawal limit for the credit card. Once the cash is dispensed, the virtual card application turns off the Bluetooth connection and logs the user out.

If the combination of PIN and random number is incorrect, the user gets 3 attempts, and then the virtual card is blocked for 24 hours.

Alternatively, the user withdraws cash from any ATM (102) from an active registered SIM card by giving a missed call to the ATM number displayed on the screen. Specifically, the user goes to the ATM (102) and gives 2 ring missed call to the number specified on the ATM display screen (106). If the caller device's IMEI number matches the registered IMEI number, the customer is prompted to use the user id and login password to login to the virtual card application. The user is then prompted to enter the combination of PIN amended with random code. If the combination is correct, the Bluetooth pairing is established and the ATM dispenses the cash based on the account balance in case of debit card and cash withdrawal limit for credit card. Once the cash is dispensed, the virtual card application turns off the Bluetooth connection and logs the user out.

If the combination of PIN and random code OTP is not entered correctly, the user can try it for 3 times at maximum. Then, the account is locked for 24 hours.

Figure 5:
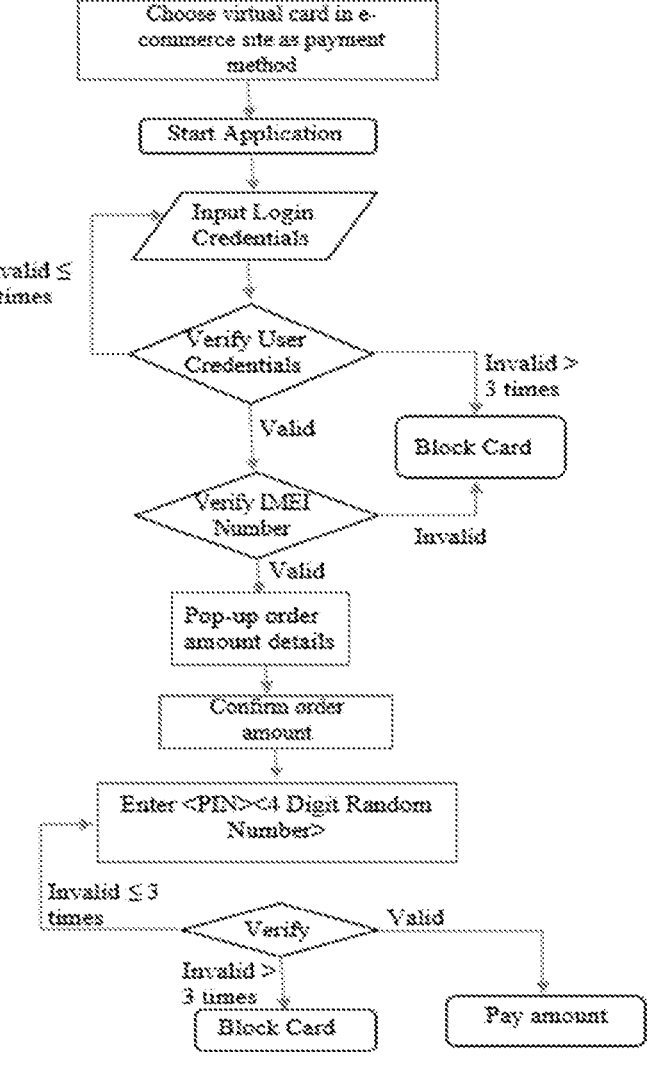
FIG. 5 shows a flowchart of the method for online payment using the virtual card, in accordance with the present invention.

In another exemplary embodiment, referring to FIG. 5, the user can use the virtual debit/credit card to do online shopping securely. While doing shopping on the e-commerce sites, the user chooses the payment method as the virtual card. The user is directed to the virtual card application. The user then logs in using the user id and login password. The user gets a pop-up with the amount details and is asked to confirm the transaction. Once confirmed, the user gets the SMS with the random code. The user enters the combination of PIN and random code in the virtual card application correctly. If correctly entered, the payment is accepted based on the account balance in case of debit card and cash withdrawal limit for credit card and redirects user to the e-commerce site. If incorrectly entered, the user is prompted to get the OTP again in the virtual card application till 3 times. Any incorrect entry blocks the card for 24 hours and re-directs the user back to the e-commerce site where the user can choose another payment method to complete the order.

Figure 6:
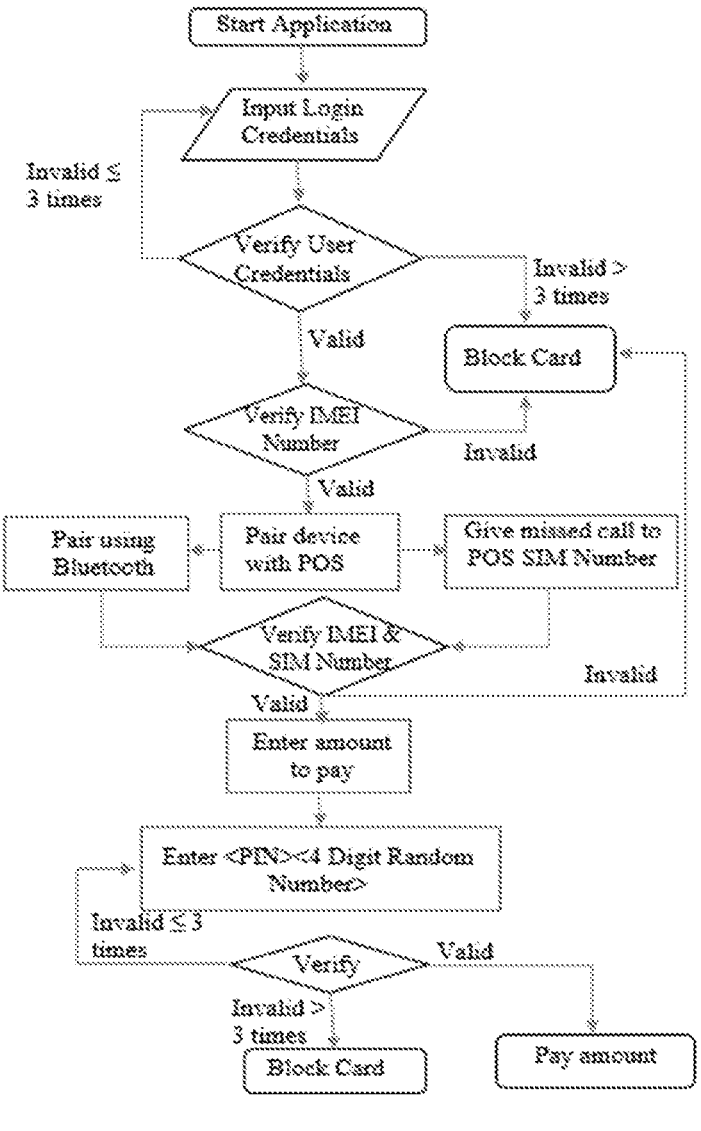
FIG. 6 shows a flowchart of the method for transaction on POS terminal using the virtual card, in accordance with the present invention.

Still in another exemplary embodiment, referring to FIG. 6, the user can use the virtual debit/credit card securely on POS terminals. The user logs in to the virtual card application with the user id and login password. The virtual card application checks if the device is already paired to the POS Bluetooth. The user should be able to pair the POS machine to his/her device via Bluetooth if not connected already. Once the pairing is done, the POS machine sends the amount to the application. Next, the user enters the PIN amended with a random number of choice. However, the same random number is not allowed in any consecutive transactions. If this is not technologically possible, the customer can give a missed call to the POS machine number. The user then enters the combination of PIN and random code correctly. If incorrectly entered, the user is prompted to enter the combination of PIN and random number again in the virtual card application till 3 times. Any incorrect entry blocks the card for 24 hours. The user is then able to enter and send the amount electronically to the paired POS.

Figure 7:
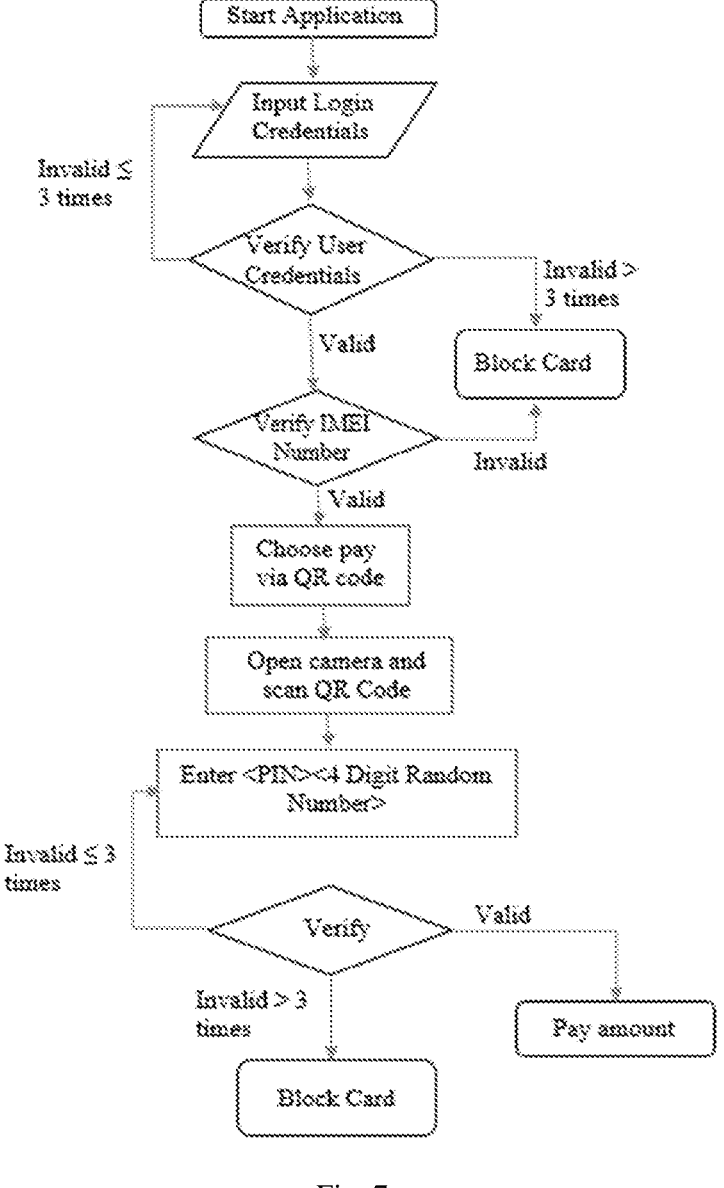
FIG. 7 shows a flowchart of the method for transaction via QR codes using the virtual card, in accordance with the present invention.

Still in another exemplary embodiment, referring to FIG. 7, the user can use the virtual debit/credit card securely to pay via QR codes. In this one embodiment, the user logs in to the virtual card application with the user id and login password. The user is provided with an option to pay someone via Pay™, UPI and the like, anyone who can use a QR code. The user opens the camera app through the virtual card application to scan the QR code. Once the QR code is identified for the payee, the user enters the combination of PIN and random code combination correctly. If incorrectly entered, the customer is prompted to get the OTP again in the virtual card application till 3 times. Any incorrect entry blocks the card for 24 hours and re-direct the user back to the e-commerce site where the user can choose another payment method to complete the order. The user is then able to enter and send the amount electronically to a payee identified by a QR code based on the account balance for debit type and credit limit for credit type of card.

Figure 8:
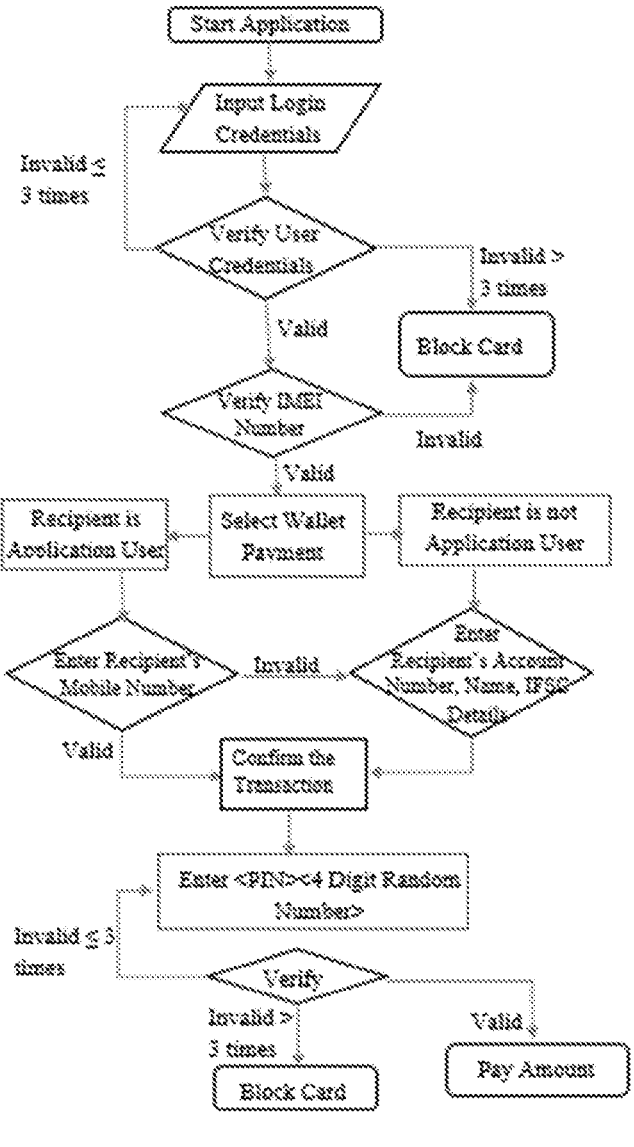
FIG. 8 shows a flowchart of the method for transaction via wallet using the virtual card, in accordance with the present invention.

Still in another exemplary embodiment, the user can use the virtual debit/credit card securely to pay via wallet (as shown in FIG. 8). The wallet enables immediate and scheduled transfer of funds to any person for the virtual card application user. In this one embodiment, the user logs in to the virtual card application with the user id and login password. The user is provided with an option to pay someone via wallet. The recipient of the payment is any one from the virtual card application user and non-user. If the recipient is the virtual card application user, then the user needs to enter the mobile number of the recipient. Once the mobile number of the recipient is verified at the backend, the user is directed to a screen where the virtual card is displayed with the name and mobile number of the recipient, which the user has to confirm for proceeding the transaction. If the mobile number entered does not match the records of the backend, the user is shown with a message to enter the correct mobile number or to enter the account details of the recipient. If the recipient is non-user of the virtual card application, the user has to select 'Payment to Non-App Users' option. Then, the user needs to enter the account holder's name, account number, IFSC details of the recipient and the amount to be transferred. Once the recipient details confirmed, the user gets the SMS with the random code. The user concatenates the PIN and random code in the virtual card application correctly. If correctly entered, the payment is accepted based on the available account balance and redirects the user to the display with a message showing 'Transaction Successful' or with an 'Error' for every failure reason. If incorrectly entered, the user is prompted to get the OTP again in the virtual card application till 3 times. Any incorrect entry blocks the card for 24 hours and re-directs the user back to the e-commerce site where the user can choose another payment method to complete the payment.

Still in another exemplary embodiment, when the user changes the mobile device (101) or the SIM card, he informs and submits the new device's IMEI number and the new SIM card number to the respective bank. The user needs to activate the virtual card every time he/she changes the mobile device/SIM card. In case of the fail transaction, the funds are refunded as per RBI norms all the time. The virtual card application may further includes feature which may check to the business account and alert them to get a GST number. This may help the government to improve the traceability and detect frauds caused due to nonpayment of GST by the businesses.

Advantages of the Invention:

1. The system and the method provide secure virtual card transactions as cloning is not possible because the virtual card is never shown to any scanner or camera, and there is no physical swipes. Also, though the mobile is stolen, the virtual card application never allows login without a user id and password. If the virtual card application is hacked, there is an additional security layer of PIN and random code combination.
2. The system and the method is useful in every possible payment method like cash withdrawal, debit, credit, QR, wallet (Online funds transfer to any account, UPI etc.). The e-commerce site can add virtual card as a new payment method or if not possible, can identify the card number in the same way as currently doing for physical cards.

3. In the current scenario of COVID-19, the system and the method facilitates contactless cash withdrawal, as the user performs the transaction from the user's mobile, hence there is no need to touch the ATM except for taking the cash.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

I claim:

1. A method for providing a virtual card using a mobile communication device for performing a transaction, the method comprising the steps of:

displaying a login menu through a graphical user interface (GUI) of the mobile communication device;

receiving entered user credentials of a user provided by an issuer financial institute;

providing a backend processor that is configured to compare the entered user credentials and configured to compare an international mobile equipment identity (IMEI) number;

verifying, by the backend processor, the entered user credentials by comparing the entered user credentials with information stored in a backend server of the issuer financial institute;

verifying, by the backend processor, the IMEI number by comparing an IMEI number of the mobile communication device used for entering user credentials with an IMEI number provided by the user to the financial institute;

blocking the virtual card if the IMEI number of the mobile communication device does not match with the IMEI number provided by the user to the financial institute;

allowing the user to change the user credentials including a PIN of choice if the IMEI number of the mobile communication device matches with the IMEI number provided by the user to the financial institute; and displaying details of the virtual card including type of the virtual card on the GUI of the mobile communication device;

wherein the backend processor enforces device-bound transaction authorization by permitting activation and use of the virtual card when the verified IMEI number corresponds to the mobile communication device initiating the transaction, and by blocking the virtual card upon detection of an IMEI mismatch;

wherein, the displayed virtual card is configured to be activated by the user using any one of a SIM card and a communication module provided on the mobile communication device;

allowing the user to withdraw cash from an automated teller machine (ATM), wherein withdrawing cash from the ATM includes the steps of:

prompting, by at least one of the ATM and the mobile communication device, the user to pair the mobile communication device with the ATM using the communication module or to give a missed call to a number displaying on the ATM using the mobile communication device, receiving, by the mobile communication device, login information from the user of a virtual card application for using the virtual card, prompting, by at least one of the ATM and the mobile communication device, the user to enter an amount to be withdrawn and the PIN appended with a 4-digit random number of choice to process a withdrawal, and dispensing, by the ATM, cash based on an account balance in case of a debit card and cash withdrawal limit;

allowing the user to pay for online shopping through at least one of a personal computer and the mobile communication device, wherein paying for online shopping includes steps of:

prompting, by at least one of the personal computer and the mobile communication device, the user to choose the virtual card as payment method while doing shopping on an e-commerce site, receiving, by the mobile communication device, login information from the user of the virtual card application;

prompting, by at least one of the personal computer and the mobile communication device, the user to confirm a transaction for the amount details shown on a pop-up window, and prompting, by at least one of the personal computer and the mobile communication device, the user to enter the PIN appended with a 4-digit random number of choice to process the transaction;

allowing the user to use the virtual card on a POS terminal by prompting the user, via at least one of the POS terminal and the mobile communication device, to pair the POS terminal with the mobile communication device using the communication module, followed by verifying, by the backend processor, the user credentials and IMEI number and then prompting the user, by at least one of the POS terminal and the mobile communication device, to enter the PIN appended with any 4-digit random number to process the transaction;

allowing the user to use the virtual card to pay via a QR code by allowing the user to open a camera of the mobile communication device for scanning the QR code from the virtual card application, followed by verifying, by the backend processor, the user credentials and IMEI number and then prompting, by at least one of the POS terminal and the mobile communication device, the user to enter the PIN appended with any 4-digit random number to process the transaction;

allowing the user to use the virtual card to pay via an electronic wallet by allowing the user to select a recipient from the application user and nonuser, and entering a mobile number of an application user recipient or account details of an application non-user recipient, followed by verifying, by the backend processor, the user credentials and IMEI number and then prompting the user, by the mobile communication device, to enter the PIN appended with any 4-digit random number to process the transaction; and blocking the virtual card at a wrong IMEI number or at an incorrect entry extending three chances of entering a correct user credential or PIN appended with random code combination.

2. The method as claimed in claim 1, further comprising activating the virtual card by receiving the user's entered PIN appended with a random four-digit number of the user's choice, followed by pairing the communication module of the mobile communication device with the communication module of the ATM.

3. The method as claimed in claim 1, further comprising activating the virtual card by receiving the user's entered PIN appended with a random four-digit number of the user's choice, followed by matching, by the backend processor, the mobile device's IMEI number and a mobile SIM card number of the received missed call on a SIM number display on the ATM with the backend information.

4. The method as claimed in claim 1, further comprising cancelling a request of the virtual card activation if the user entered PIN and random digit combination or a caller number and IMEI number of the mobile device does not match backend information.

* * * * *